(12) United States Patent
Zimmer

(10) Patent No.: US 6,687,949 B2
(45) Date of Patent: Feb. 10, 2004

(54) WIPER ARM WITH COVER CAP

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,718

(22) PCT Filed: Jul. 11, 2001

(86) PCT No.: PCT/DE01/02597

§ 371 (c)(1),
(2), (4) Date: Jul. 25, 2002

(87) PCT Pub. No.: WO02/08033

PCT Pub. Date: Jan. 31, 2002

(65) Prior Publication Data

US 2003/0028991 A1 Feb. 13, 2003

(30) Foreign Application Priority Data

Jul. 21, 2000 (DE) .......................................... 100 35 462

(51) Int. Cl.⁷ ................................ B60S 1/34; B60S 1/32
(52) U.S. Cl. ............................. 15/250.351; 15/250.34; 403/23
(58) Field of Search ....................... 15/250.351, 250.352, 15/250.34, 250.001, 250.31; 403/23

(56) References Cited

U.S. PATENT DOCUMENTS

| | | | | | |
|---|---|---|---|---|---|
| 2,860,365 A | * | 11/1958 | Krohm | ................... | 15/250.352 |
| 3,263,261 A | * | 8/1966 | Schulz | ..................... | 15/257.01 |
| 3,729,767 A | * | 5/1973 | Edele et al. | ............. | 15/250.34 |
| 3,800,356 A | * | 4/1974 | Ito | ........................... | 15/250.34 |
| 4,704,761 A | * | 11/1987 | South et al. | ............. | 15/250.19 |
| 4,856,137 A | * | 8/1989 | Palu | ......................... | 15/250.31 |
| 5,233,720 A | * | 8/1993 | Schon | ..................... | 15/250.31 |
| 5,327,614 A | * | 7/1994 | Egner-Walter et al. | .. | 15/250.04 |
| 6,195,832 B1 | * | 3/2001 | Shuen | ................... | 15/250.201 |
| 6,233,778 B1 | * | 5/2001 | Daenen | ................. | 15/250.351 |
| 6,581,238 B1 | * | 6/2003 | Sevellec | ............... | 15/250.351 |

FOREIGN PATENT DOCUMENTS

| | | | | |
|---|---|---|---|---|
| DE | 23 26 183 | | 12/1974 | |
| DE | 198 33 488 | | 1/1999 | |
| FR | 2462311 | * | 2/1981 | ............. 15/250.34 |
| FR | 2488842 | * | 2/1982 | ............. 15/250.34 |
| FR | 2543897 | * | 10/1984 | ............. 15/250.34 |
| FR | 2652325 | * | 3/1991 | ........... 15/250.351 |
| GB | 756 229 | | 9/1956 | |
| GB | 1 435 778 | | 5/1976 | |

* cited by examiner

*Primary Examiner*—Gary K. Graham
(74) *Attorney, Agent, or Firm*—Kenyon & Kenyon

(57) ABSTRACT

A wiper arm including a securing member and a hinge member coupled thereto via a hinged joint, and a cover cap affixed to the securing member and having a cover wall and side walls laterally contiguous thereto which cover the securing member. Adjacent to the cover cap toward the hinge member is a movable hinge cap which is coupled to the hinge member and covers the hinged joint, while it is guided on the securing member and the cover cap, respectively, in a manner that it is able to swivel and is movable in longitudinal direction.

16 Claims, 4 Drawing Sheets

US 6,687,949 B2

WIPER ARM WITH COVER CAP

FIELD OF THE INVENTION

The present invention relates to a wiper arm.

BACKGROUND INFORMATION

German Published Patent No. 23 26 183 describes a wiper arm which includes a plastic cover cap. It is mounted on the securing member and is retained on a bearing bush of the hinged joint by open bearing eyes in a manner allowing it to swivel. The cover cap completely covers the securing member, particularly the connection area to a wiper shaft and the hinge bearing of the hinged joint. On the inner side, the cover cap also has stop webs which guide and retain it on the securing member. The hinge member engages with its u-shaped profile in the region of the hinged joint over the cover cap, so that lateral rivet heads of a hinge pin and gaps between the hinge member and the cover cap, particularly on the upper side, which may be desirable for the swivelling motion of the hinge member may be seen. The visual impression may thereby be disturbed.

SUMMARY OF THE INVENTION

According to the present invention, adjacent to the cover cap toward the hinge member is a movable hinge cap which may be coupled to the hinge member and may cover the hinged joint, while it is guided on the securing member and the cover cap, respectively, in a manner so that it may swivel and move in the longitudinal direction. The hinge cap includes a u-shaped cross-section which may be adapted to the profile of the cover cap and the profile of the hinge member, a smooth and harmonious transition may thereby be formed in the hinge region. In addition, the hinge pin may be covered, so that overall, the hinged joint may receive an aerodynamically favorable form.

For securing purposes, the hinge cap may include on the inner sides of its side walls, studs which engage in holes in the side walls of the hinge member and in elongated holes in the side walls of the securing member, respectively. In this context, the studs may be dimensioned such that, during assembly by pushing the side walls of the hinge cap apart, they may snap into these holes and the hinge cap may be mounted on the hinge member in a simple manner and without additional expenditure.

While the hinge cap may be rotationally mounted in the circular holes of the hinge member, in addition, the elongated holes in the securing member may be used as elements for the kinematic guidance of the hinge cap.

When the wiper arm is lying against the vehicle windshield, the ends of the side walls of the hinge cap may partially overlap the side walls of the hinge member to the outside, while the side walls of the cover cap may overlap the side walls of the hinge cap a bit to the outside. In addition, in this extended position, the cover wall of the hinge cap may join up flush with the cover wall of the cover cap and of the hinge member, resulting in a visually closed form of the wiper arm. At the same time, this may be aerodynamic and may produce almost no wind noise.

During the swinging process, the hinge member may be raised from the vehicle windshield. In this context, the kinematics of the hinge cap may be configured such that the end of the hinge cap allocated to the hinge member is raised, while the end of the hinge cap pointing toward the securing member is lowered and plunges into a free space between the cover cap and the securing member.

Thus, the swinging process may not be hindered by the hinge cap, and the hinged joint may be covered even in this position. When the wiper arm lays down on the vehicle windshield, the parts may lie contiguous to one another again without a gap.

Given the covering of the wiper arm according to the present invention, in principle it may be possible to retain the usual hinge construction. If the hinge member and/or the securing member is/are configured as bent sheet-metal parts, the holes and elongated holes for the sequence of motion may be simply and cost-effectively produced by punching. In addition, due to the covering in the hinge region, it may be possible for the cover wall of the securing member to be taken back in the hinge region. The normally closed form of the securing member in the region of the hinged joint may no be longer necessary, which likewise may reduce the production cost.

The hinge cap and the cover cap may be produced from plastic by injection molding. The plastic may simultaneously be wear-resistant, dimensionally stable and stabilized with respect to ultraviolet light, or may be able to be lacquered. In order to avoid material accumulations in the region of the studs, they may be ring-shaped in cross-section and may have openings at the periphery which permit a lateral ejection from the mold. In addition, pre-molded on the inner sides of the side walls of the hinge cap may include ribs which improve the guidance during the swinging process and prevent jamming of the components.

Furthermore, the configuration of the cover cap and of the hinge cap may be so adjusted to one another and so adapted to the hinge member and the vehicle that the quality of the product may become apparent. With the embodiment of the caps as an add-on part, the configuration and thus the appearance of the windshield wiper may easily be changed, using identical hinge components. Finally, when working with a short securing member, the cover cap and the hinge cap may be combined to form a one-piece component which may be mounted in the same manner as the hinge cap on the hinge member and securing member.

DETAILED DESCRIPTION

Figure 1:
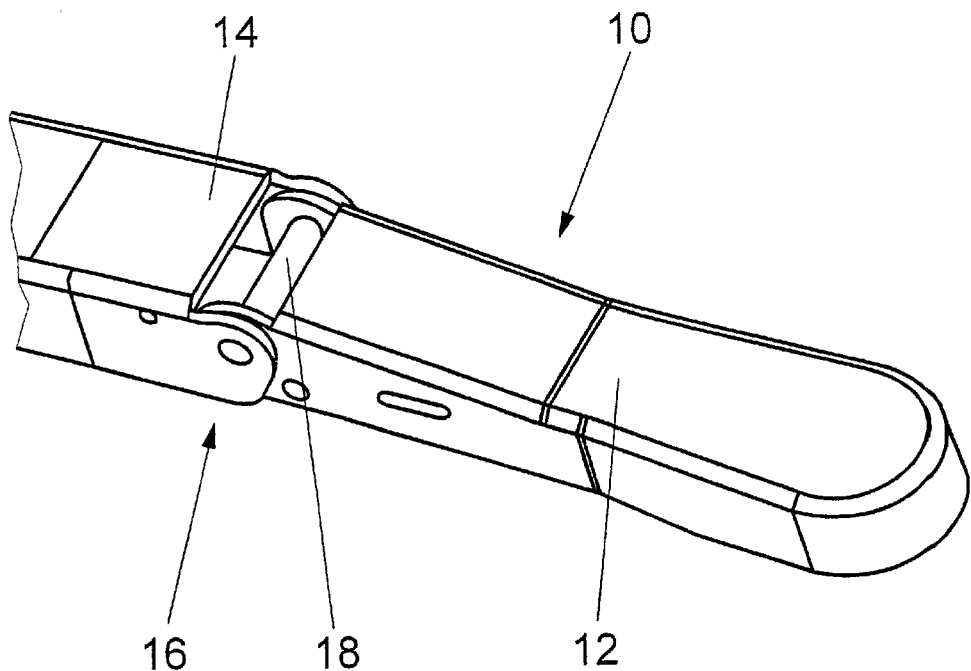
FIG. 1 shows a perspective partial view of a wiper arm.
Figure 2:
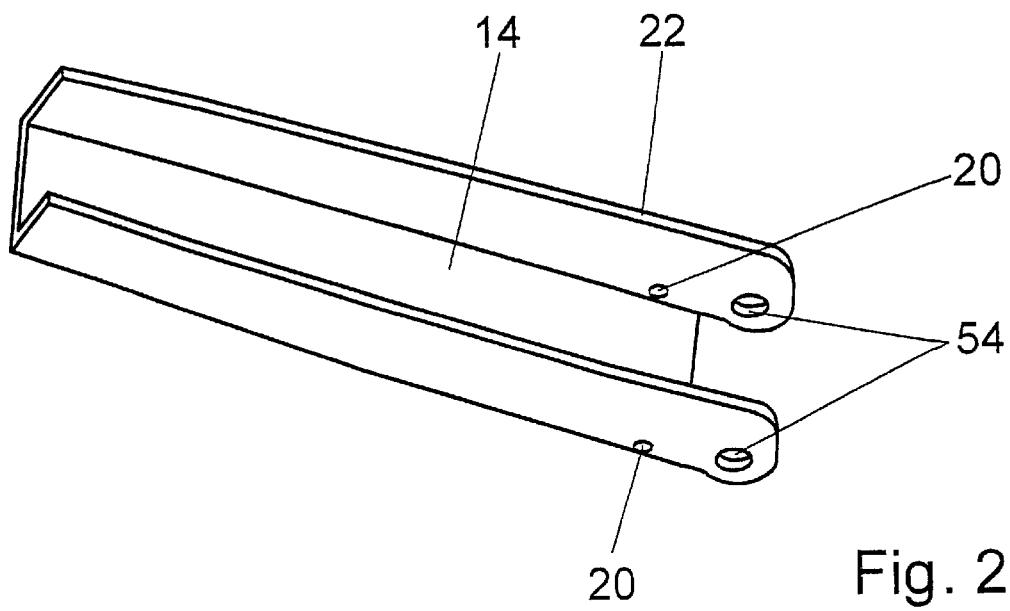
FIG. 2 shows a hinge member of the wiper arm in perspective view from below.
Figure 3:
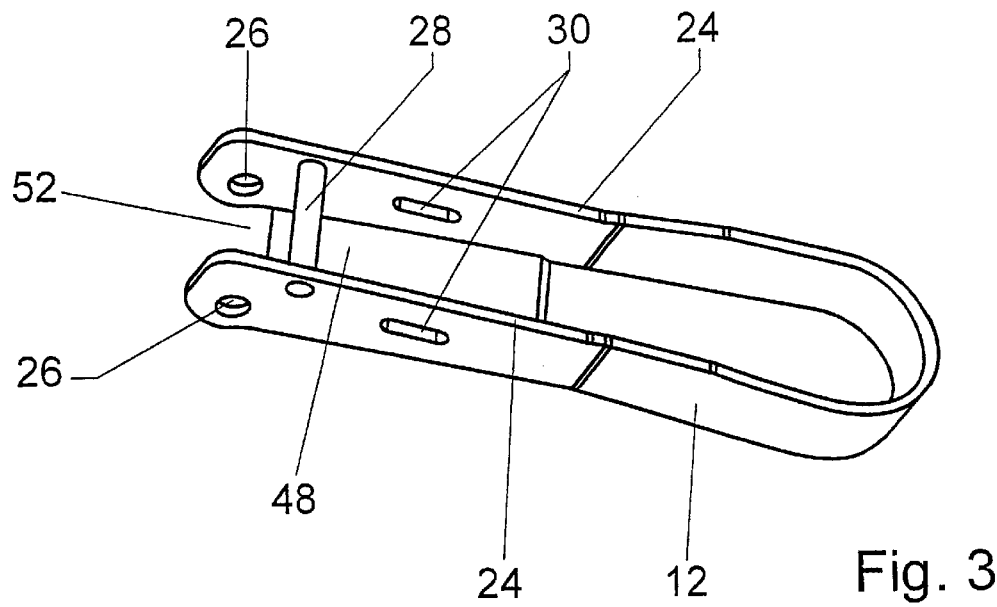
FIG. 3 shows a securing member of the wiper arm in perspective view from below.
Figure 4:
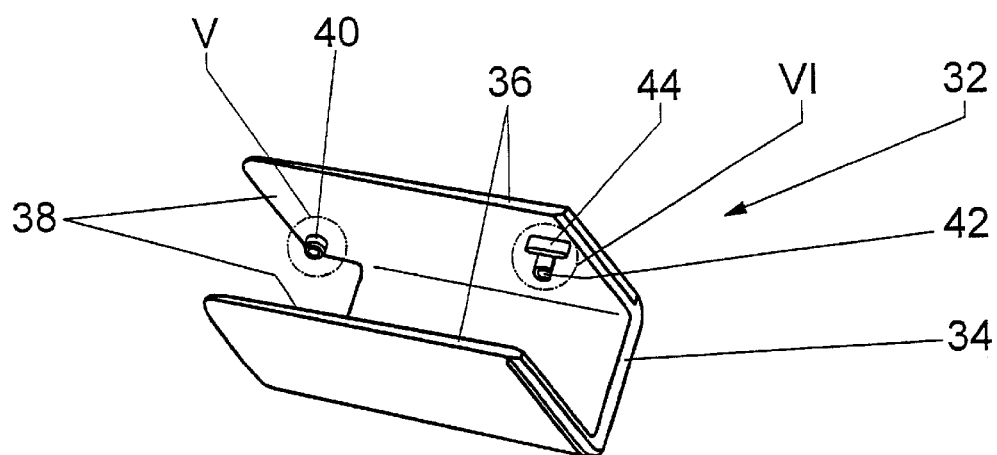
FIG. 4 shows a hinge cap in perspective view from below.

A securing member 12 of a wiper arm 10 is connected to a hinge member 14 via a hinged joint 16 (FIG. 1). A hinge pin 18, which is riveted in holes 54 in side walls 22 of hinge member 14 and is supported via bearing bores 26 in side walls 24 of securing member 12, forms the swivel axis of the hinged joint.

A hinge cap 32, which may be produced from plastic in the injection molding process, covers hinged joint 16. It is put on preassembled wiper arm 10 onto hinge member 14 and securing member 12. To that end, hinge cap 32 has a u-shaped cross-section adapted to adjacent components 12, 14 of wiper arm 10. Provided on inner sides 38 of side walls 36 of hinge cap 32 are studs 40 and 42 which are not visible from the outside and which engage in holes 20 in side walls 22 of hinge member 14 and in elongated holes 30 in side walls 24 of securing member 12.

Figure 7:
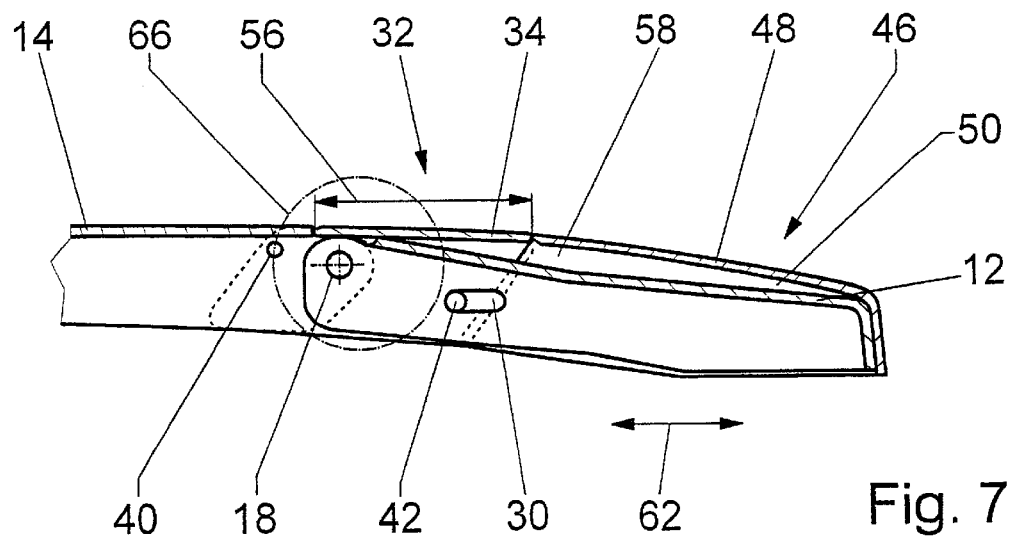
FIG. 7 shows a partial longitudinal section through the wiper arm in an extended state.
Figure 8:
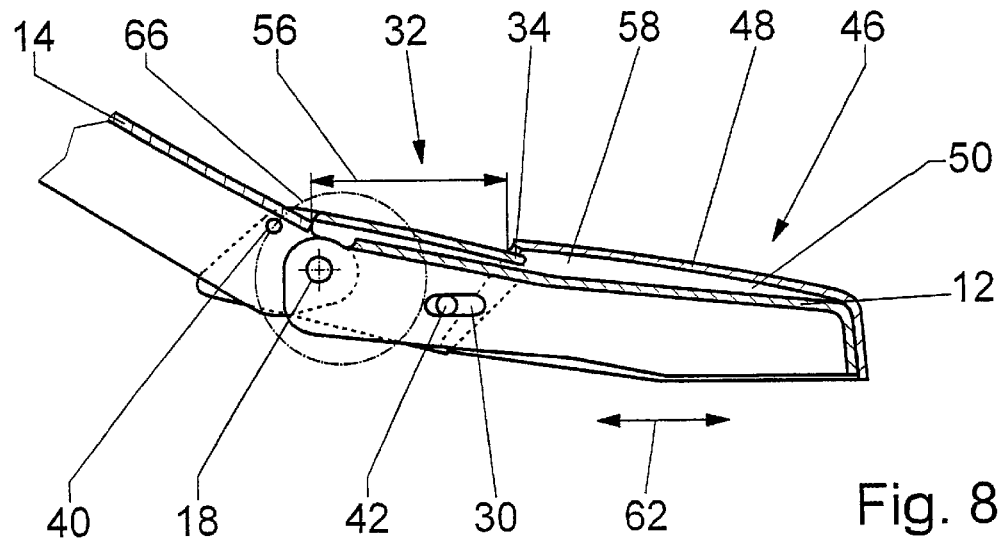
FIG. 8 shows a partial longitudinal section through the wiper arm in partially tilted position.

In the extended state, when the windshield wiper is lying against a vehicle windshield, hinge cap 32 joins up with hinge member 14 and reaches up to a cover cap 46 which covers the fastening region of wiper arm 10 on a wiper shaft (FIG. 7). In this position, cover wall 34 of hinge cap 32 terminates flush with cover wall 48 of cover cap 46 and the upper contour of hinge member 14. Side walls 36 of hinge cap 32 are configured so that they partially overlap side walls 22 of hinge member 14. In the boundary area between hinge cap 32 and cover cap 46, side walls 36 of hinge cap 32 are overlapped by side walls 50 of cover cap 46. Thus, wiper arm 10 has a continuous transition between hinge member 14, hinge cap 32 and cover cap 46, adjusted to each other in size, resulting in a closed and compact form. In this position, studs 40 are supported in holes 20 in hinge member 14, and studs 42 are in an end position of elongated holes 30 in securing member 12. When wiper arm 10 swings away from the vehicle windshield, the sequence of motion of hinge cap 32 is determined by the position of holes 20, of elongated holes 30 and of studs 40, 42, as well as by the shape of elongated holes 30.

During the swing of hinge member 14, its holes 20 describe a circular path 66 about hinge pin 18 of the hinged joint. Corresponding to the circular movement, hinge cap 32 is raised in the region of holes 20 and is shifted in the direction of the remote end of securing member 12. During this movement, it is guided by its studs 42 which engage in elongated holes 30 on securing member 12. The position of holes 20 on hinge member 14 and the position of elongated holes 30 on securing member 12 are adjusted to one another in such a manner that, during the swing movement, no collision occurs between hinge cap 32 and hinge member 14, securing member 12 or cover cap 46 fixedly seated thereon. In addition to the positions of holes 20 and elongated holes 30 relative to each other, the movement of hinge cap 32 may be influenced by the shape of elongated holes 30 which may run straight or curved in longitudinal direction 62.

Figure 9:
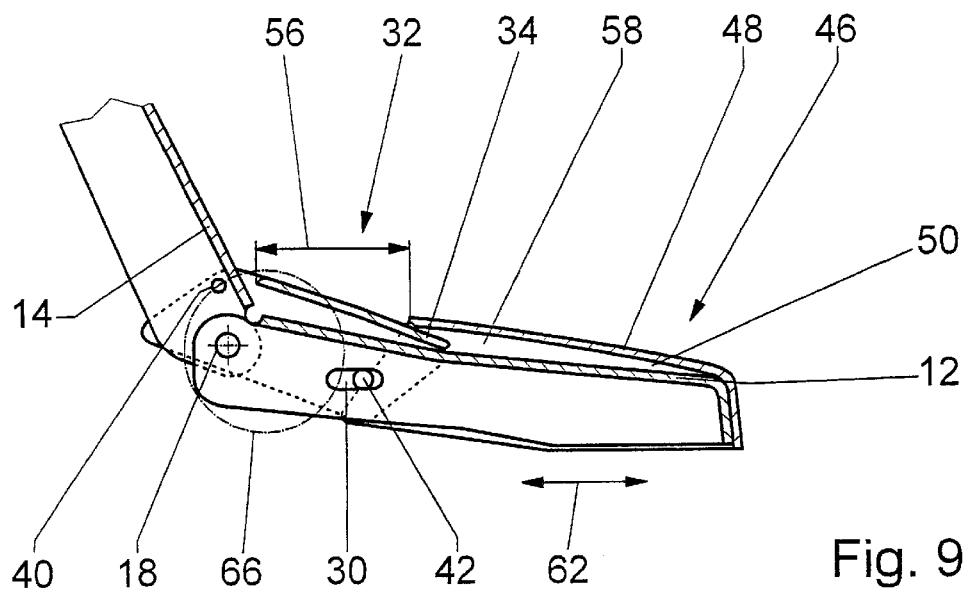
FIG. 9 shows a partial longitudinal section through the wiper arm in tilted position shortly before reaching an end position.

During the swinging, a gap 56, covered by hinge cap 32, between hinge member 14 and cover cap 46 decreases compared to the extended position. In order to ensure a free motion, cover wall 34 of hinge cap 32, which has a constant length, is lowered into a free space 58 between cover cap 46 and securing member 12 until it reaches an end position. Side walls 50, 36 and 22, nested into one another, also overlap to a greater degree (FIG. 9).

Figure 5:
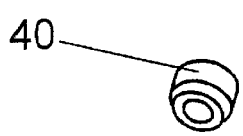
FIG. 5 shows an enlarged representation of a detail V in FIG. 4.

Given a sufficient diameter of studs 40, 42, in order to avoid an accumulation of material in this region, studs 40, 42 have a circular cross-section (FIG. 5).

Figure 6:
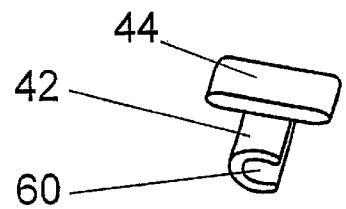
FIG. 6 shows an enlarged representation of a detail VI in FIG. 4.

At the periphery, studs 42 have openings 60 which permit lateral removal from a die mold (not shown) (FIG. 6). In the region of studs 42, ribs 44, which guide hinge cap 32 on securing member 12, are pre-molded on inner sides 38 of side walls 36 of hinge cap 32.

Securing member 12 and hinge member 14 may be implemented as bent sheet-metal parts. Holes 20 for studs 40, elongated holes 30 for studs 42, holes for a spring insert 28, holes S4 for the hinge pin and bearing bores 26 may be punched from a sheet-metal blank without significant extra expense. Covering wall 48 of securing member 12 is taken back in region 52 of hinged joint 16.

Figure 10:
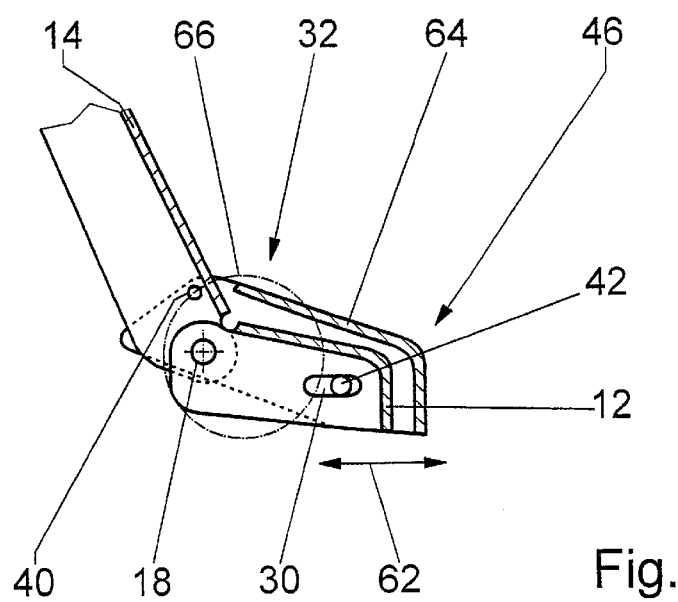
FIG. 10 shows a wiper arm according to FIG. 9 having a short securing member.

In the construction according to FIG. 10, wiper arm 10 has a short securing member 12. In this case, it may be possible to combine cover cap 46 and hinge cap 32 to form a one-piece component 64 which, in the same manner as hinge cap 32 of the other constructions, is mounted on securing member 12 and hinge member 14.

What is claimed is:

1. A wiper arm, comprising:

a securing member;

a hinged joint;

a hinge member coupled to the securing member via the hinged joint;

a cover cap affixed to the securing member and including a cover wall and side walls laterally contiguous thereto which cover the securing member; and a movable hinge cap adjacent to the cover cap toward the hinge member and coupled to the hinge member, the hinge cap configured to cover the hinged joint and to swivel and move in a longitudinal direction while guided on the securing member and the cover cap.

2. The wiper arm according to claim 1, wherein the hinge cap is configured to slip onto at least one of the hinge member and the securing member.

3. The wiper arm according to claim 1, wherein the hinge cap includes studs that are on inner sides of side walls thereof and that are invisible from an outside view, the studs configured to engage in holes in side walls of the hinge member and in elongated holes in side walls of the securing member.

4. The wiper arm according to claim 3, wherein the studs are configured to snap into the holes of the hinge member and the elongated holes of the securing member by pushing side walls of the hinge cap apart.

5. The wiper arm according to claim 3, wherein at least one of the studs includes a circular cross-section.

6. The wiper arm according to claim 5, wherein the hinge cap is produced from plastic by injection molding, and at least one of the studs includes an opening at a periphery to permit lateral removal from a mold.

7. The wiper arm according to claim 1, wherein inner sides of side walls of the hinge cap include ribs.

8. The wiper arm according to claim 1, wherein a longitudinal extension of elongated holes in side walls of the securing member is curved.

9. The wiper arm according to claim 1, wherein the hinge cap and the cover cap are produced from plastic.

10. The wiper arm according to claim 9, wherein the plastic is simultaneously wear-resistant, dimensionally stable, and stabilized with respect to an ultraviolet light.

11. The wiper arm according to claim 9, wherein the plastic is simultaneously wear-resistant, dimensionally stable, and able to be lacquered.

12. The wiper arm according to claim 1, wherein:

ends of side walls of the hinge cap partially overlap side walls of the hinge member on an outward side of the hinge member, and the side walls of the cover cap overlap side walls of the hinge cap to an outside.

13. The wiper arm according to claim 1, wherein:

if the wiper arm is in an extended position, a cover wall of the hinge cap is configured to terminate flush with the cover wall of the cover cap and an upper contour of the hinge member, and kinematics of the hinge cap are configured such that if the hinge member is lifted, an end of the hinge cap allocated to the hinge member is configured to lift and an end of the hinge cap on a side toward the securing member is configured to lower and plunge into a free space between the cover cap and the securing member.

14. The wiper arm according to claim 1, wherein configurations of the hinge member, the hinge cap, and the cover cap are adjusted to one another.

15. The wiper arm according to claim 1, wherein a cover wall of the securing member is shortened lengthwise in a region of the hinged joint.

16. The wiper arm according to claim 1, wherein the securing member includes a short extension in the longitudinal direction, and the hinge cap and the cover cap form a one-piece component.

* * * * *